(12) United States Patent
Ettling

(10) Patent No.: US 10,926,115 B2
(45) Date of Patent: Feb. 23, 2021

(54) FALL PROTECTION APPARATUS AND METHOD

(71) Applicant: THE BOEING COMPANY, Chicago, IL (US)

(72) Inventor: Karl James Ettling, Chicago, IL (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/276,180

(22) Filed: Sep. 26, 2016

(65) Prior Publication Data

US 2018/0085611 A1    Mar. 29, 2018

(51) Int. Cl.
    *A62B 35/00*    (2006.01)
    *B64F 5/40*    (2017.01)
(52) U.S. Cl.
    CPC ...... *A62B 35/0068* (2013.01); *A62B 35/0037* (2013.01); *B64F 5/40* (2017.01)
(58) Field of Classification Search
    CPC ..... B64F 5/40; A62B 35/0043; A62B 35/005; A62B 35/0056; A62B 35/0068; A62B 35/0037; B64D 9/003
    See application file for complete search history.

(56) References Cited

U.S. PATENT DOCUMENTS

| | | | | |
|---|---|---|---|---|
| 3,106,377 A | * | 10/1963 | Cotton | B60P 7/0807 410/116 |
| 3,367,000 A | * | 2/1968 | Schluter | B60P 7/0807 24/573.11 |
| 5,036,949 A | * | 8/1991 | Crocker | A62B 35/04 182/3 |
| 5,143,170 A | * | 9/1992 | Hunt | A62B 35/04 182/3 |
| 5,230,295 A | * | 7/1993 | Shell | B60P 7/0823 114/218 |
| 5,282,597 A | * | 2/1994 | Babcock | E04D 13/12 248/237 |

(Continued)

FOREIGN PATENT DOCUMENTS

GB    2466460 A    6/2010

OTHER PUBLICATIONS

Extended European Search Report dated Jan. 22, 2018 for application No. 17193258.5, 8 pgs.

(Continued)

*Primary Examiner* — Daniel P Cahn
(74) *Attorney, Agent, or Firm* — Moore Intellectual Property Law, PLLC

(57) ABSTRACT

A system and method for restraining movement using a first adapter and a second adapter. The first adapter includes a first body, a first engagement component connected to the first body, and a first fastening component configured to fasten to a first attachment point of an aircraft. The second adapter includes a second body, a second engagement component connected to the second body, and a second fastening component configured to fasten to a second attachment point of the aircraft. The second attachment point is different from the first attachment point. The first and second engagement components are each configured to connect with a harness, and the first fastening component has a physical structure different from a physical structure of the second fastening component.

20 Claims, 6 Drawing Sheets

(56) References Cited

U.S. PATENT DOCUMENTS

| | | | | |
|---|---|---|---|---|
| 5,653,308 A * | 8/1997 | White | E04G 21/3233 | 182/138 |
| 5,823,588 A * | 10/1998 | Morghen | B66C 1/66 | 294/89 |
| 5,845,452 A * | 12/1998 | Pantano | E04D 15/00 | 52/698 |
| 6,098,746 A * | 8/2000 | Castaneda | A62B 35/0043 | 182/45 |
| 6,478,111 B2 * | 11/2002 | Olson | A62B 35/0056 | 182/3 |
| 6,547,033 B1 * | 4/2003 | Cheval | A62B 35/0056 | 182/3 |
| 6,712,569 B1 * | 3/2004 | Wang | B60P 7/0807 | 410/107 |
| 6,823,799 B2 * | 11/2004 | Gleave | E04D 13/10 | 104/111 |
| 8,794,886 B1 * | 8/2014 | Nett | B60P 7/0807 | 410/106 |
| 8,894,329 B1 * | 11/2014 | Kekahuna | F16B 13/066 | 405/259.3 |
| 9,010,487 B2 * | 4/2015 | Cruz | E04G 21/3276 | 182/3 |
| 9,272,167 B2 * | 3/2016 | Smit | A62B 35/0043 | |
| 2002/0148680 A1 * | 10/2002 | Lee | A62B 35/0056 | 182/3 |
| 2003/0006094 A1 * | 1/2003 | Cole | A62B 35/0056 | 182/3 |
| 2003/0099525 A1 * | 5/2003 | Michels | F16B 5/02 | 411/431 |
| 2004/0258498 A1 * | 12/2004 | Bruns | B60P 7/0815 | 410/115 |
| 2004/0265087 A1 * | 12/2004 | Bruns | B60P 7/0807 | 410/107 |
| 2006/0032703 A1 * | 2/2006 | Burdet | A62B 35/0068 | 182/3 |
| 2006/0272892 A1 * | 12/2006 | Poldmaa | A62B 1/04 | 182/36 |
| 2006/0273600 A1 * | 12/2006 | Rohlf | A62B 35/0068 | 248/683 |
| 2007/0095978 A1 * | 5/2007 | Oetken | B64C 1/20 | 244/118.1 |
| 2008/0006750 A1 * | 1/2008 | Flux | A62B 35/005 | 248/231.9 |
| 2010/0065370 A1 * | 3/2010 | Frauendorf | A62B 35/04 | 182/3 |
| 2010/0133040 A1 * | 6/2010 | London | A62B 1/04 | 182/3 |
| 2011/0174575 A1 * | 7/2011 | Sidla | A62B 35/0056 | 182/231 |
| 2011/0239580 A1 * | 10/2011 | Rodewald | A62B 35/0068 | 52/699 |
| 2012/0031702 A1 * | 2/2012 | Bissett | E04G 5/04 | 182/113 |
| 2013/0091690 A1 * | 4/2013 | Stephenson | F16G 11/00 | 29/525.01 |
| 2013/0168528 A1 * | 7/2013 | Patton | A62B 35/0068 | 248/548 |
| 2013/0185906 A1 * | 7/2013 | Nichols, Jr. | A62B 35/0068 | 24/703.1 |
| 2014/0013700 A1 * | 1/2014 | Pierce | A62B 35/0068 | 52/698 |
| 2014/0060966 A1 | 3/2014 | Patel et al. | | |
| 2014/0060967 A1 * | 3/2014 | Patton | A62B 35/0068 | 182/3 |
| 2014/0131519 A1 * | 5/2014 | Benthien | B64C 1/18 | 244/131 |
| 2014/0217255 A1 * | 8/2014 | Rinklake | F16B 45/00 | 248/304 |
| 2014/0224579 A1 * | 8/2014 | Balascak | E04G 21/328 | 182/3 |
| 2014/0251724 A1 * | 9/2014 | Nichols, Jr. | A62B 35/0068 | 182/3 |
| 2015/0224350 A1 * | 8/2015 | Harvey | A62B 35/0068 | 248/231.9 |
| 2016/0017618 A1 * | 1/2016 | White | F16M 13/022 | 182/138 |
| 2016/0194890 A1 * | 7/2016 | Landry | E04G 21/3276 | 248/237 |
| 2017/0144001 A1 * | 5/2017 | Jones | A62B 35/0068 | |
| 2017/0259090 A1 * | 9/2017 | Gaines | F16M 13/022 | |
| 2018/0086449 A1 * | 3/2018 | Sarigul-Klijn | B64C 31/02 | |
| 2018/0126199 A1 * | 5/2018 | Thornton | A62B 35/0006 | |

OTHER PUBLICATIONS

Mingledorff, Meredith Staff Sgt. "349th Air Mobility Wing Stresses—Safety First". www.349amw.afrc.af.mil, pp. 1-2, 2010.

Hy-Safe Technology. "Aircraft Fall Protection". https://hysafe.com, pp. 1-2, 2016.

Fallproof. "Anchor Points—Fall Protection Anchors". www.fallproof.com, pp. 1-3, 2016.

Latchways PLC. "WinGrip Aircraft Fall Protection". www.latchways.com/wingrip, pp. 1-4, 2016.

Flexible Lifeline Systems. "Wingrip Twin Pad Anchor System". http://proteccioncontracaidas.com/fall-arrest-systems/aircraft, p. 1-3, 2009.

Latchways PLC. "WinGrip Single-User System". www.latchways.com/wingrip-single-user-system, pp. 1-2, 2016.

Extended European Search Report dated Jan. 22, 2018 in corresponding EP Application No. 17193258.5, 8 pgs.

Communication pursuant to Article 94(3) EPC dated Mar. 1, 2019 in corresponding EP Application No. 17193258.5, 5 pgs.

Examination Report from the Arab States of the Gulf for Application No. GC 2017-34018, dated Jul. 31, 2019, 7 pgs.

Invitation to Respond to Written Opinion dated Apr. 23, 2020 mailed in corresponding Singapore Patent Application No. 10201707935U, 10 pgs.

Communication pursuant to Article 94(3) EPC dated Mar. 6, 2020 issued in corresponding EP Application No. 17193258.5, pp. 1-4.

* cited by examiner

FALL PROTECTION APPARATUS AND METHOD

BACKGROUND

The present disclosure relates to a system and method that may be employed to restrain an operator that is performing an operation on a portion of an aircraft or other vehicle or apparatus.

Aircraft technicians may walk across a wing of an aircraft or other aircraft component so as to service, inspect, or maintain the aircraft. There is an increased desire to improve safety protocol for such technicians, as current protocols in some situations only require the technician to wear steel-toed shoes and a bump cap with ear protection.

There have been employed methods to secure a person overhead to aid in safety when performing operations on, for example, an aircraft wing. However, these methods of securing a person involve attachment to a ceiling or other overhead portion of a hangar or other building component that is impractical, expensive, or otherwise difficult to provide in various situations. Further, such a configuration may be difficult to utilize when working with aircraft when there is no overhead structure, such as, for field service of an aircraft or on an aircraft carrier.

SUMMARY

In one embodiment, a restraint system is provided comprising a first and second adapter. The first adapter includes a first body, a first engagement component connected to the first body, and a first fastening component configured to fasten to a first attachment point of an aircraft. The second adapter includes a second body, a second engagement component connected to the second body, and a second fastening component configured to fasten to a second attachment point of the aircraft. The second attachment point is different from the first attachment point. The first and second engagement components are each configured to connect with a safety harness, and the first fastening component has a physical structure different from a physical structure of the second fastening component.

In another embodiment, a method for securing an operator to a component of an aircraft is provided. The component includes a surface, a forward attachment point and an aft attachment point. The method includes connecting a forward adapter to the forward attachment point, the forward adapter including a first body, a first ring connected to the first body, and a first fastening component that connects the first body to the forward attachment point. The method further includes connecting an aft adapter to the aft attachment point, the aft adapter including a second body, a second ring connected to the second body, and a second fastening component that connects the second body to the aft attachment point. The first fastening component has a different physical structure from the second fastening component. The method further includes connecting a lanyard to each of the adapters and connecting each lanyard to a harness worn by the operator.

In another embodiment, a kit is provided. The kit includes a forward adapter configured to connect with a forward attachment point of a wing of an aircraft, the forward adapter comprising a body, a ring rotatably connected to the body, and a forward fastening component configured to connect the body of the forward adapter to the forward attachment point of the wing of the aircraft. The kit further includes an aft adapter configured to connect with an aft attachment point of the wing of the aircraft, the aft adapter comprising a body, a ring rotatably connected to the body, and an aft fastening component configured to connect the body of the aft adapter to the aft attachment point of the wing of the aircraft. The forward and aft adapters are configured to allow multi-axis movement along the wing of the aircraft while limiting a travel distance forward and aft on the wing of the aircraft.

DETAILED DESCRIPTION

Figure 1:
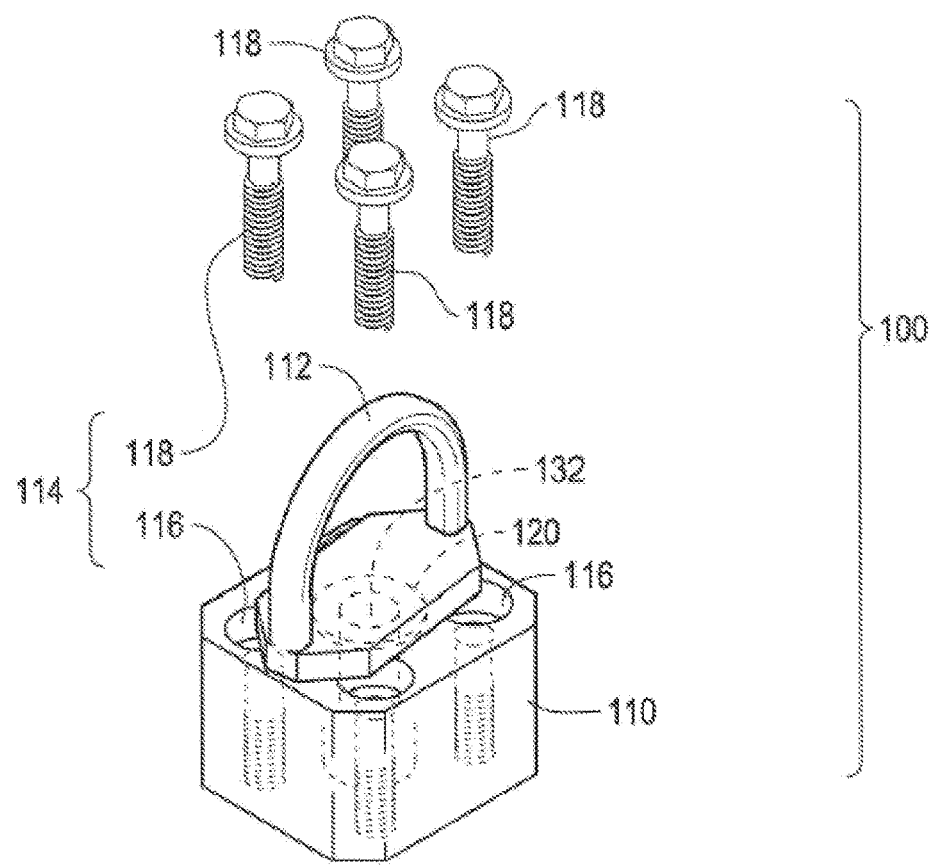
FIG. 1 is a diagram illustrating a configuration of an adapter.

The following detailed description of certain embodiments will be better understood when read in conjunction with the appended drawings. It should be understood that the various embodiments are not limited to the arrangements and instrumentality shown in the drawings.

Various embodiments include apparatus, system, kits, and methods for securing or restraining an operator to a component, which may be an aircraft wing. The apparatus, system, kits, and methods employed herein in various embodiments allow an operator to be able to move forward and aft, and side-to-side along a wing so as to perform the appropriate maintenance, inspection, service, and/or other operations, while restraining the operator to a predetermined area of the wing.

As described herein, a restraint system 800 includes a first adapter 100 and a second adapter 400. FIG. 1 shows an example of a first adapter 100. The first adapter 100 includes a body 110, an engagement component 112, and a fastening component 114. The body 110 may be referred to as a second body, the engagement component 112 may be referred to as a first engagement component, and the fastening component 114 may be referred to as a first fastening component. The first adapter 100 can include a bushing 120. In the illustrated configuration, a stem 132 of an engagement component 112 is provided through the bushing 120 (e.g., inserted through the bushing 120). The engagement component 112 of the first adapter 100 may be any suitable component that can connect to the body 110 and allow for a connection to other components ultimately to be secured to a user. In the example of FIG. 1, the engagement component 112 is shown as a ring. In some examples, the engagement component 112 is a D-ring. The use of such a ring may comply with regulatory requirements and/or requirements of a supplier of a safety harness so as to ensure adequate liability and/or responsibility for particular parties. The engagement component 112 in various embodiments is movable relative to the body 110. For example, in some embodiments, the engagement component 112 is connected to the body 110 so as to be able to rotate or swivel up to a complete 360° in both directions of rotation. In the illustrated embodiment, the engagement component 112 is a ring having a planar base portion connected to a top surface of the body 110 with a ring portion extending vertically and transverse to the planar base portion. The configuration of the engagement component 112, including the size and shape thereof, may depend on a desired or needed configuration.

The first adapter 100 is also provided with at least one fastening component 114. In the example of FIG. 1, the fastening component 114 includes a plurality of bolts 118 and a plurality of holes 116 within the body 110. The bolts 118 are configured to be received in the holes 116. The configuration of the fastening component 114 is not particularly limited, though the fastening component 114 should be configured to allow for fastening to a particular attachment point, such as a first attachment point, of the aircraft, an attachment point being a point on any outer portion of the aircraft whereby the fastening component 114 can be attached. In one example, the first attachment point is the forward attachment point 802 (shown in FIG. 8).

In operation, the fastening component 114 includes the bolts 118 that can connect the first adapter 100 to the attachment point of the aircraft by means of placing the bolts 118 through the holes 116 to thereby fasten the first adapter 100 to the attachment point of the aircraft. The attachment point, as discussed later, may be at a forward section of a component of the aircraft. As should be appreciated, the holes 116 are sized and shaped to receive the bolts 118 therein to securely fasten the first adapter 100 to the attachment point of the aircraft. In some examples, the holes 116 of the first adapter 100 may be counter-bored so that the top of the bolts 118 will not interfere with the ability of the engagement component 112 to swivel.

The number of holes 116 and bolts 118 is not limited and may be selected based upon the configuration of the first attachment point to which the fastening component 114 will be connected. For an attachment point on at least one known aircraft, four holes 116 and four bolts 118 are provided, with the holes 116 provided on respective corner portions of the body 110.

Figure 2:
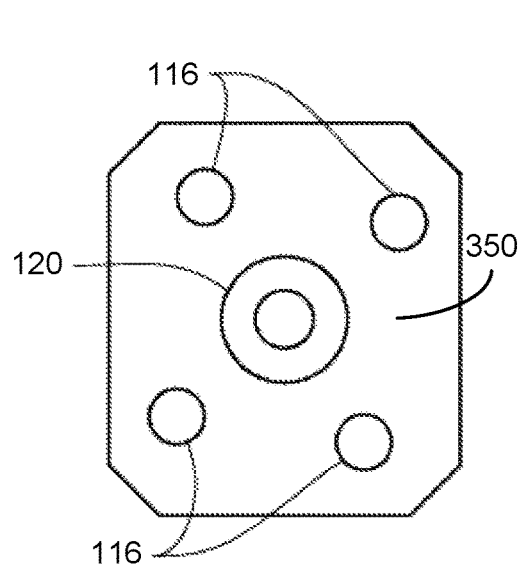
FIG. 2 is a diagram of a bottom view of a portion of the adapter.

As shown in FIG. 2, which is a bottom view of the first adapter 100 shown in FIG. 1, the holes 116 for receiving the bolts 118 may also be offset with respect to each other, and thus not disposed at exactly the same location near their respective corners. Further, the bushing 120 may be provided in a generally central location on the bottom face of the body 110.

In some examples, the first adapter 100 is provided to fasten, by means of the fastening component 114, to a forward attachment point of an aircraft wing. For the one known aircraft mentioned above, the forward attachment point of the aircraft wing, as described in more detail in connection with FIG. 8 below, has a configuration having bolt holes that correspond to the holes 116 of the first adapter 100.

The first adapter 100 may be made of any suitable material having the strength and flexibility to achieve proper connecting to the attachment point of the aircraft. In some embodiments, the body 110 or other portions of the first adapter 100 are formed of one or more metals (e.g., aluminum, steel, or any suitable metal). However, plastics (such as those provided using additive manufacturing) can also be used in manufacture for the body 110 or other portions of the first adapter 100. Further, some portions of the first adapter 100 may be made of metal, and others may be made of plastics or other materials.

Figure 3:
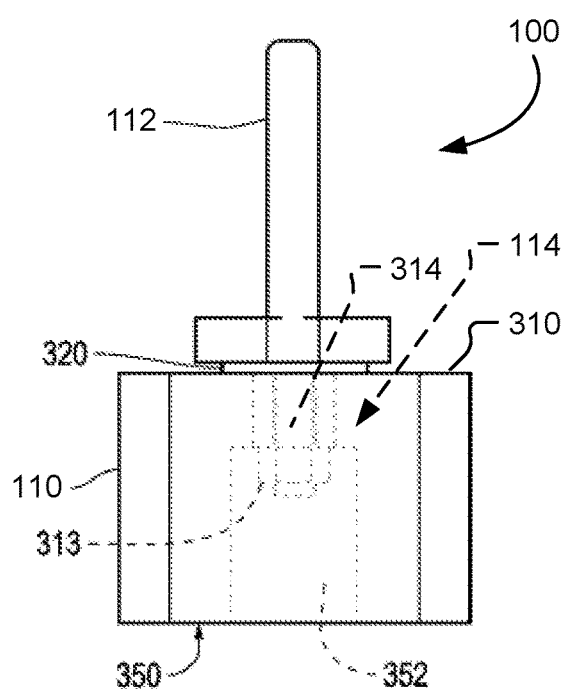
FIG. 3 is a diagram showing portions of the adapter.

FIG. 3 shows another view of the first adapter 100. The view provides for the body 110, which can be in the form of a mounting adapter. On a face of the body 110 is provided a bushing 320. The bushing 320 may be provided as a flange bushing. The bushing 320 may be provided between a surface of the body 110 and the fastening component 114. In this embodiment, the fastening component 114 may include an anchorage connector, which may be in the form of a bolt or a cap screw, which can be provided so as to connect the first adapter 100 to a respective attachment point.

In a situation whereby the engagement component 112 is connected to the body 110, this may occur by means of a nut 313 inserted into a recess 352 at a surface, such as a bottom surface 350 of the body 110, where the end of a bolt 314 can be accessed. The inclusion of such a recess 352 may prevent the nut 313 and the bolt 314 from touching the surface of the wing when in use.

Figure 4:
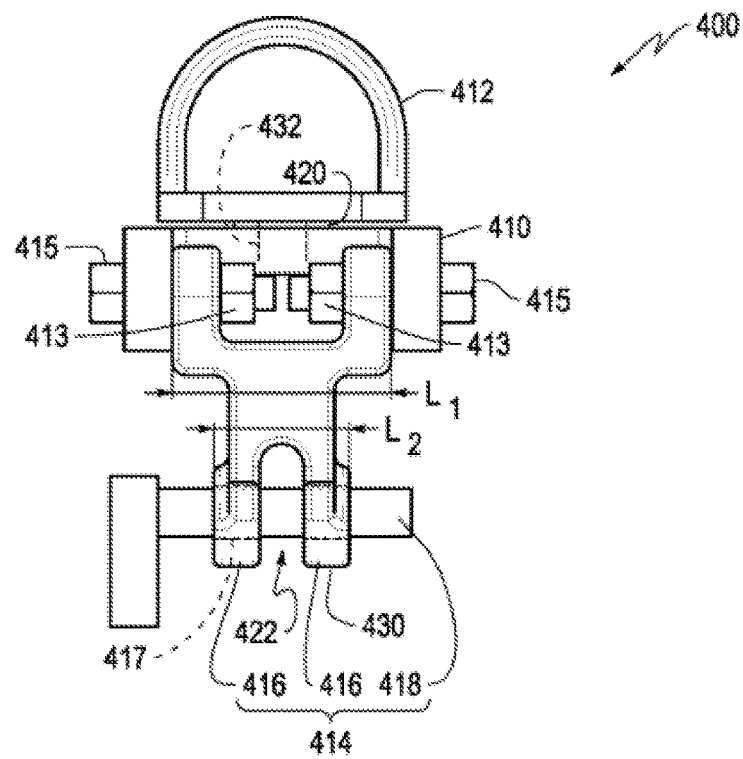
FIG. 4 is a diagram illustrating another configuration of an adapter.

FIG. 4 shows an example of a second adapter 400. The second adapter 400 includes a body 410, an engagement component 412, and a fastening component 414. The body 410 may be referred to a second body, the engagement component 412 may be referred to as a second engagement component, and the fastening component 414 may be referred to as a second fastening component. The body 410 may be a single piece structure, or may be a multi-component structure with components bolted together via bolts 415. In the illustrated embodiment, the second adapter 400 includes a bushing 420 that is configured to receive therethrough a stem 432 of an engagement component 412. For example, the bushing 420 may be configured as blocks extending transverse to a top portion of the body 410 and having holes therein that are parallel to each other in a plane parallel to the top surface of the body 410. The engagement component 412 of the second adapter 400 may be any suitable component that can connect to the body 410 and allow for connection to other components ultimately to be secured to a user. In the example of FIG. 4, the engagement component 412 is shown as a ring. In some examples, the engagement component 412 is a D-ring. The engagement component 412 may be connected to any portion of the body 410. The use of such a ring may comply with regulatory requirements and/or requirements of a supplier of a safety harness so as to ensure adequate liability and/or responsibility for particular parties. The engagement component 412 may be provided so as to be able to rotate or swivel up to a full 360°.

The second adapter 400 is also provided with at least one fastening component 414. In the example of FIG. 4, the fastening component 414 includes a plurality of legs 416 that define a slot 422 therebetween. The number of legs 416 is not particularly limited, nor is the configuration of the fastening component 414. However, the fastening component 414, including the selection of the number and positioning of legs 416, should be configured so as to allow for fastening to a particular second attachment point of the aircraft (or any attachment point additional to the attachment point described with reference to FIG. 1), to which the fastening component 414 will be connected. The attachment point, as discussed later, may be at an aft section of a component of the aircraft. For the known aircraft example mentioned above, two substantially symmetrical legs 416 are provided extending outward from the body 410, and on an opposite side of the body 410 from the engagement component 412.

The legs 416 may be formed whereby a maximum horizontal length of the legs 416 combined with the slot 422 is higher than that of the portion of the body 410 from which the legs extend. The maximum horizontal length of the legs 416 combined with the slot 422 may be less than a maximum horizontal length of the body 410 generally, as the body 410 may have different horizontal lengths throughout its structure. As shown in FIG. 4, a first length L1 corresponding to a maximum horizontal length of the body 410 may be less than a second length L2 of the body 410 at a lower position along the body 410 than the first length L1.

The legs 416 and slot 422 are configured in the illustrated embodiment to allow a fastener in the form of a pin 418 to extend through holes 417 in the legs 416, and through the slot 422. The fastening component 414 including the legs 416, pin 418, and slot 422 can be used to connect the second adapter 400 to a second attachment point, such as an aft attachment point, of an aircraft wing. The second attachment point may be a lug that is disposed on the aft section 803 of an aircraft wing 810.

When connected to the second attachment point, the second adapter 400 can cover a portion of the rear of the wing so that a bottom surface 430 of the second adapter 400 is configured to prevent any alteration or damage of a surface of an aircraft wing.

The second adapter 400 may be made of any suitable material having the strength and flexibility to achieve proper connecting to the attachment point of the aircraft. In some embodiments, the body 410 or other portions of the second adapter 400 is formed of one or more metals (e.g., aluminum, steel, or any suitable metal). However, plastics (such as those provided using additive manufacturing) can also be used in manufacture for the body 410 or other portions of the second adapter 400. Further, some portions of the second adapter 400 may be made of metal, and others may be made of plastics or other materials.

In a situation whereby the engagement component 412 is connected to the body 410, this may occur by means of a nut 413 inserted into a recess at a surface, such as an inner surface of the body 410, where the end of bolt 415 can be accessed. The inclusion of such a recess may prevent the nut 413 and the bolt 415 from touching the surface of the wing when in use.

Figure 5:
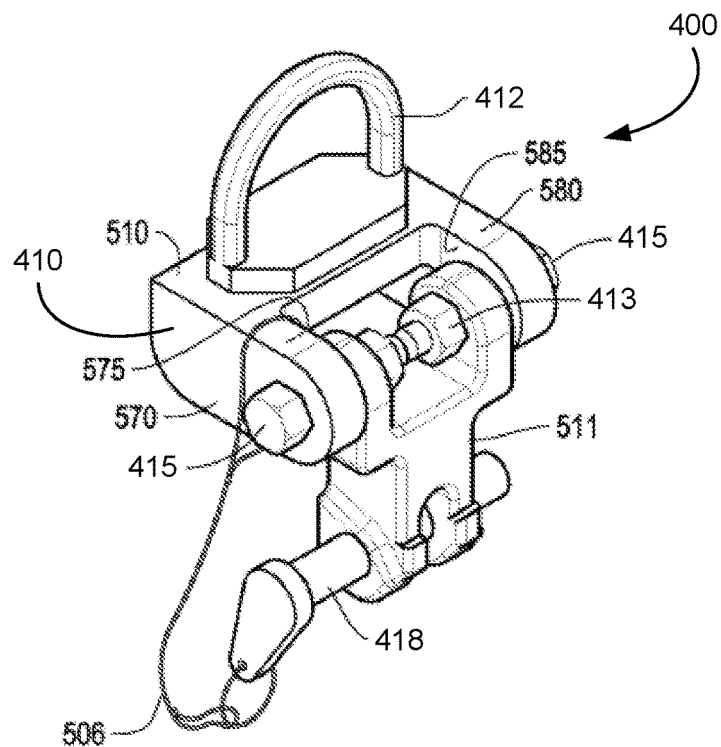
FIG. 5 is another diagram illustrating the another configuration of the adapter.

With reference to FIG. 5, which is another view of the second adapter 400 shown in FIG. 4, the body 410 may include a first mounting plate 510 and a second mounting plate 511 extending substantially perpendicularly from the first mounting plate 510. The mounting plates 510, 511 may be connected by a nut-and-bolt arrangement, for example using a nut 413 (i.e., in the form of a high torque point flange nut) and a bolt 415 arrangement, the bolt 415 provided on a first outer face 570 of the first mounting plate 510 portion of the body 410, and the nut 413 extending from a first inner face 575 of the first mounting plate 510 to a second inner face 585 of the first mounting plate 510. A bolt 415 may also be included on a second outer face 580 of the first mounting plate 510.

A pin 418 may be provided so as to extend through the holes 417 in the legs 416, as described with reference to FIG. 4, above. A lanyard 506 may be arranged to extend from an extension portion of either the pin 418 or the body 410 generally, or directly from the body 410 (e.g., from the second mounting plate 511). Further, the lanyard 506 may be made of stainless steel or any suitable material. The lanyard 506 may be removably stored on a portion of the body 410 such as on the first mounting plate 510 when not in use, and may be designed to extend to a safety harness in use.

Figure 6:
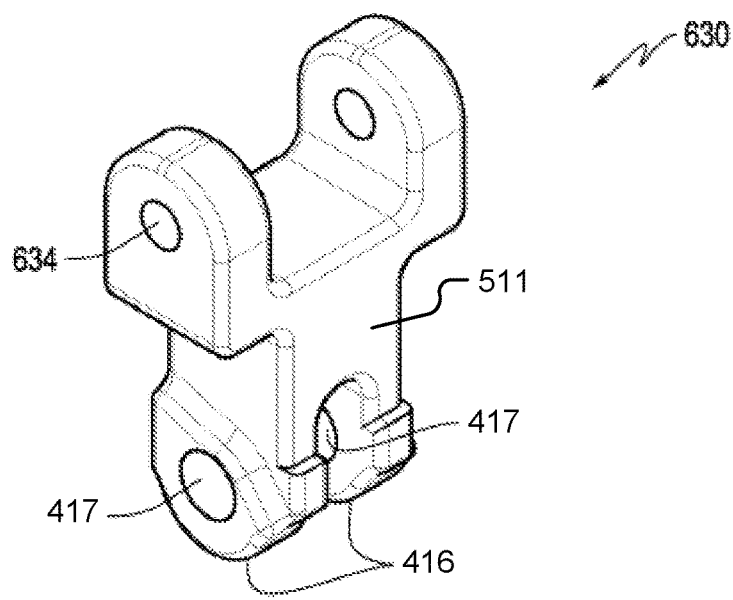
FIG. 6 is a diagram illustrating a portion of the another configuration of the adapter.

FIG. 6 shows an inner portion 630 of the body 410 shown in FIG. 4. The inner portion 630 can be used as the second mounting plate 511. In FIG. 6, the inner portion 630 of the body 410 has the holes 417 in the legs 416 for receiving the pin 418 (shown in FIGS. 4 and 5). The top portion of the inner portion 630 may also be provided with holes 634 whereby the bolt 415 and the nut 413 arrangement can be included. The configuration shown in FIG. 6 is one in which the body 410 of FIG. 4 is a multiple-piece arrangement.

Figure 7:
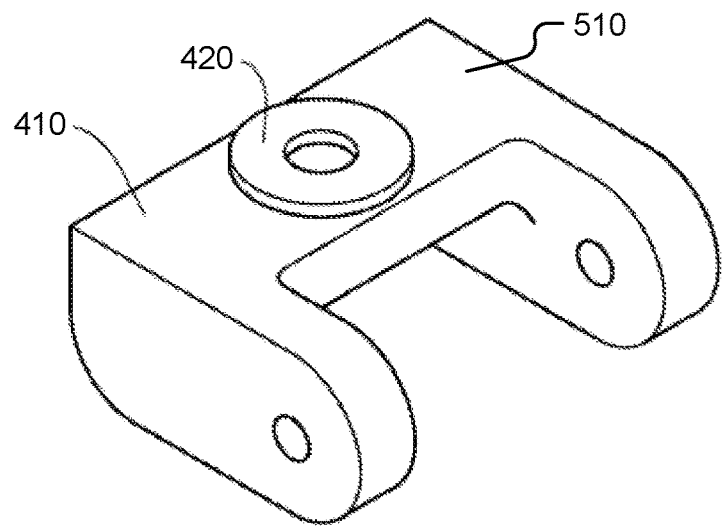
FIG. 7 is a diagram illustrating another portion of the another configuration of the adapter.

FIG. 7 shows a bushing 420 in a generally central portion of the body 410. The bushing 420 may be provided at a location whereby an engagement component, such as engagement component 412 discussed with reference to FIG. 4, can be inserted, and the presence of the bushing 420 may aid in the engagement component 412 being able to swivel with respect to the body 410.

Figure 8:
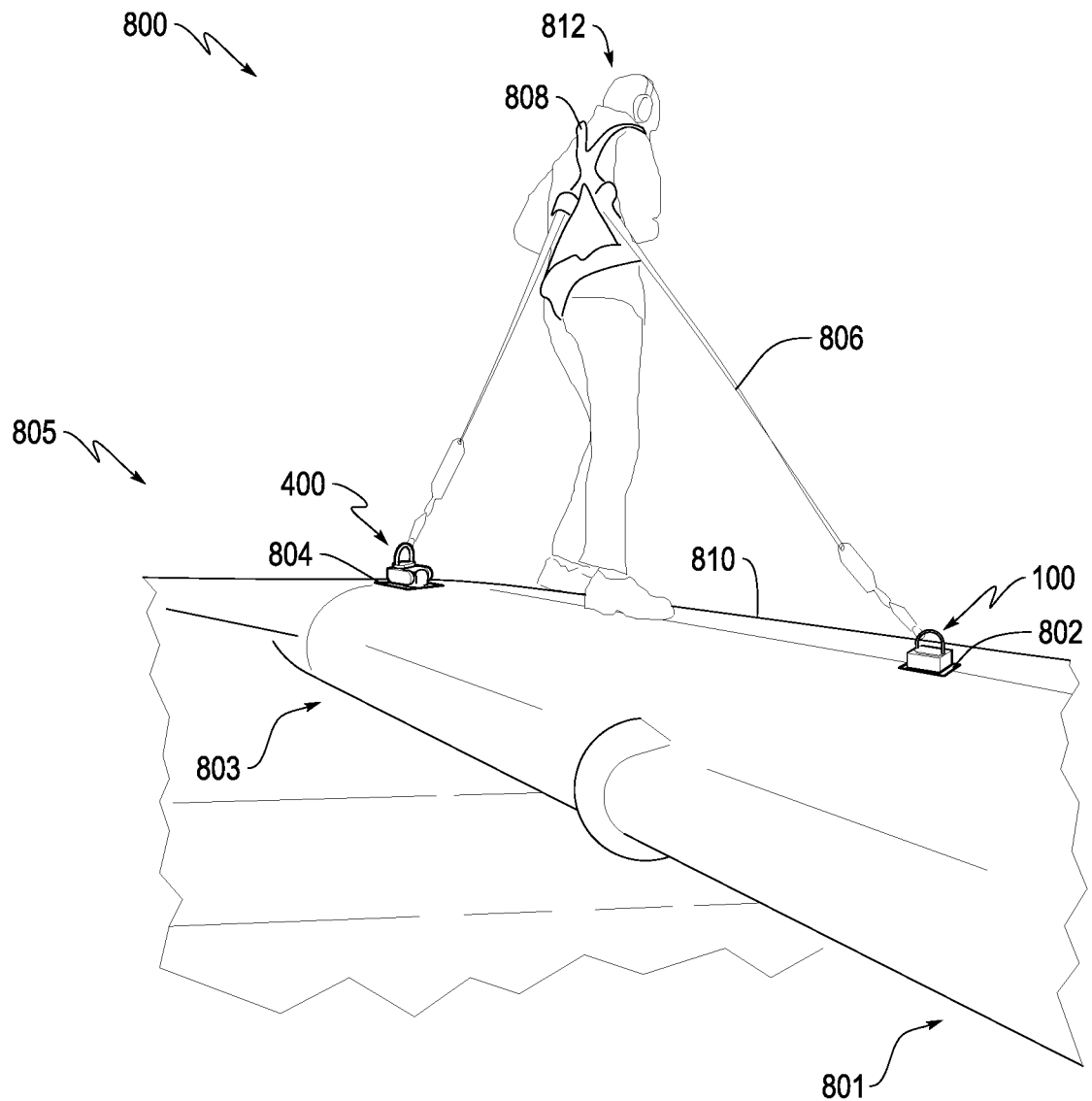
FIG. 8 is a diagram illustrating a restraint system in use.

FIG. 8 shows an example of a restraint system 800 in use. In the illustrated embodiments, the first adapter 100 is connected to a forward attachment point 802 at a forward section 801 of a component of an aircraft 805. The component can be a wing 810 of the aircraft 805, and the forward attachment point 802 is a first attachment point of the aircraft 805. Similarly, the second adapter 400 is connected to an aft attachment point 804 at an aft section 803 of the component of the aircraft 805. The aft attachment point 804 is a second attachment point of the aircraft 805. Each of these attachment points are fastening arrangements on the wing 810. The fastening arrangements can be aircraft hoisting points, which are arrangements on the aircraft 805 used for raising or lowering the aircraft by machines (e.g., cranes) or other means.

Extending from each of the first adapter 100 and second adapter 400 are one or more lanyards 806 (one connected to each adapter 100 and 400 is illustrated). The lanyards 806 may be configured to connect to a respective adapter 100, 400, for example by hooking to each of the adapters 100, 400 via a hook (or other member) releasably connected to the engagement components 112, 412 of the respective adapters 100, 400. The lanyards 806 extend to a harness 808 that is worn by an operator 812. It should be noted that the lanyards 806 may be fixed length elements (e.g., straps) that may be retractably connected to the harness 808 worn on a back of the operator 812.

The length, width, and material of the lanyards 806 is not particularly limited. However, the length in various embodiments is determined based on the dimensions of the wing 810 or other component upon which the operator is traversing. In some examples, the lanyards 806 are appropriately sized so as to allow the operator 812 to have forward and aft movement along the wing, as well as side-to-side movement, thus allowing for a full 360° range of movement along the wing 810. However, the lanyards 806 also are sized so as to ensure that the operator has forward and aft movement restrained in such a way whereby the user does not fall off the wing 810 or other aircraft component. That is, the lanyards 806 may be sized to define a maximum movement direction along the wing 810 in multiple directions or axes. In the illustrated embodiment, the first adapter 100 connected to the forward attachment point 802 effectively prevents the operator 812 from moving too far aft, and the second adapter 400 connected to the aft attachment point 804 effectively prevents the operator 812 from moving too far forward, while allowing movement laterally along at least a portion of the wing. Accordingly, the restraint system 800 allows the operator freedom of movement to perform the required work at a particular location while still providing full fall protection.

The harness 808 may be a safety harness configured to allow the lanyards 806 to extend therefrom.

The configuration of each of the first adapter 100 and the second adapter 400 may be particularly designed to work with predetermined attachment points on an aircraft. While such attachment points are not limited to a single forward and single aft attachment point on a wing as described above, it should be noted that the restraint system 800, and particularly the adapters 100, 400 are constructed to connect to already-existing aircraft attachment points, so that the aircraft requires no modification for the restraint system 800 to be used with the aircraft. Further, the first and second fastening components 114, 414, and the first adapter 100 and the second adapter 400 generally, may have physical structures that are different from each other to ensure the ability to connect to different attachment points along the aircraft. It also should be noted that in some embodiment, multiple first adapters 100 and/or multiple second adapters 400 may be provided and used at the same time or at different times (e.g., as the operator 812 moves further along the wing).

In some embodiments, the first adapter 100 and the second adapter 400 are sequentially or simultaneously connected to respective attachment points 802, 804. The adapters 100, 400 may be connected to the attachment points 802, 804 by means of the fastening components 114, 414, which may include securing the adapters 100, 400 to the attachment points 802, 804 by screwing, bolting, or otherwise connecting the adapters 100, 400 to the respective attachment points 802, 804. Once the adapters 100, 400 are connected, or even prior to connecting the adapters 100, 400, the operator 812 may be connected to the adapters by virtue of the lanyards 806 extending from the safety harness 808, the lanyards 806 being connected to the engagement components 112, 412 of the adapters 100, 400.

Figure 10:
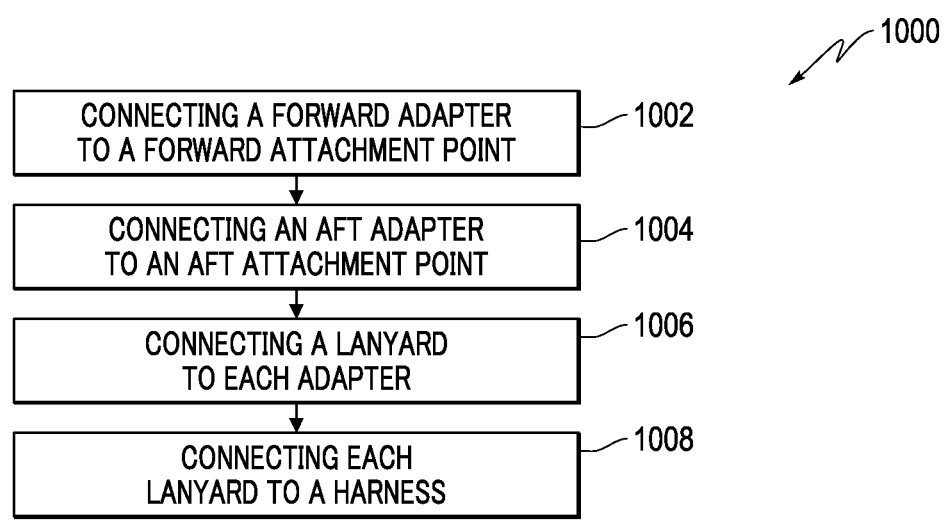
FIG. 10 is a flow chart of a method for securing an operator to a component of an aircraft.

As an example, FIG. 10 shows a method 1000 for securing the operator 812 to a component of an aircraft such as a wing 810. The component includes a forward attachment point 802 and an aft attachment point 804. The method 1000 may include connecting 1002 the first adapter 100 to the forward attachment point 802. The first adapter 100 includes a body 110, a first engagement component 112 in the form of a ring connected to the body 110, and a first fastening component 114 that connects the body 110 to the forward attachment point 802. When the first adapter 100 is coupled to the forward attachment point 802, the first adapter 100 may be referred to as a forward adapter.

The method 1000 further includes connecting 1004 the second adapter 400 to the aft attachment point 804. The second adapter 400 includes the body 410, a second engagement component 412 in the form of second ring connected to the second body 410, and a second fastening component 414 that connects the body 410 to the aft attachment point 804. The first fastening component 114 has a different physical structure from the second fastening component 414. When the second adapter 400 is coupled to the aft attachment point 804, the second adapter 400 may be referred to as an aft adapter.

The method 1000 further includes connecting 1006 a lanyard 806 to each of the adapters 100, 400 and connecting 1008 each lanyard 806 to a harness 808 worn by the operator 812.

The steps of connecting 1002, 1004 the forward and aft adapters 100, 400 to respective attachment points 802, 804 may be done simultaneously or sequentially. Further, each connection may occur prior to, simultaneously with, or after the connection of the lanyards 806 between the harness 808 and each of the adapters 100, 400.

Figure 9:
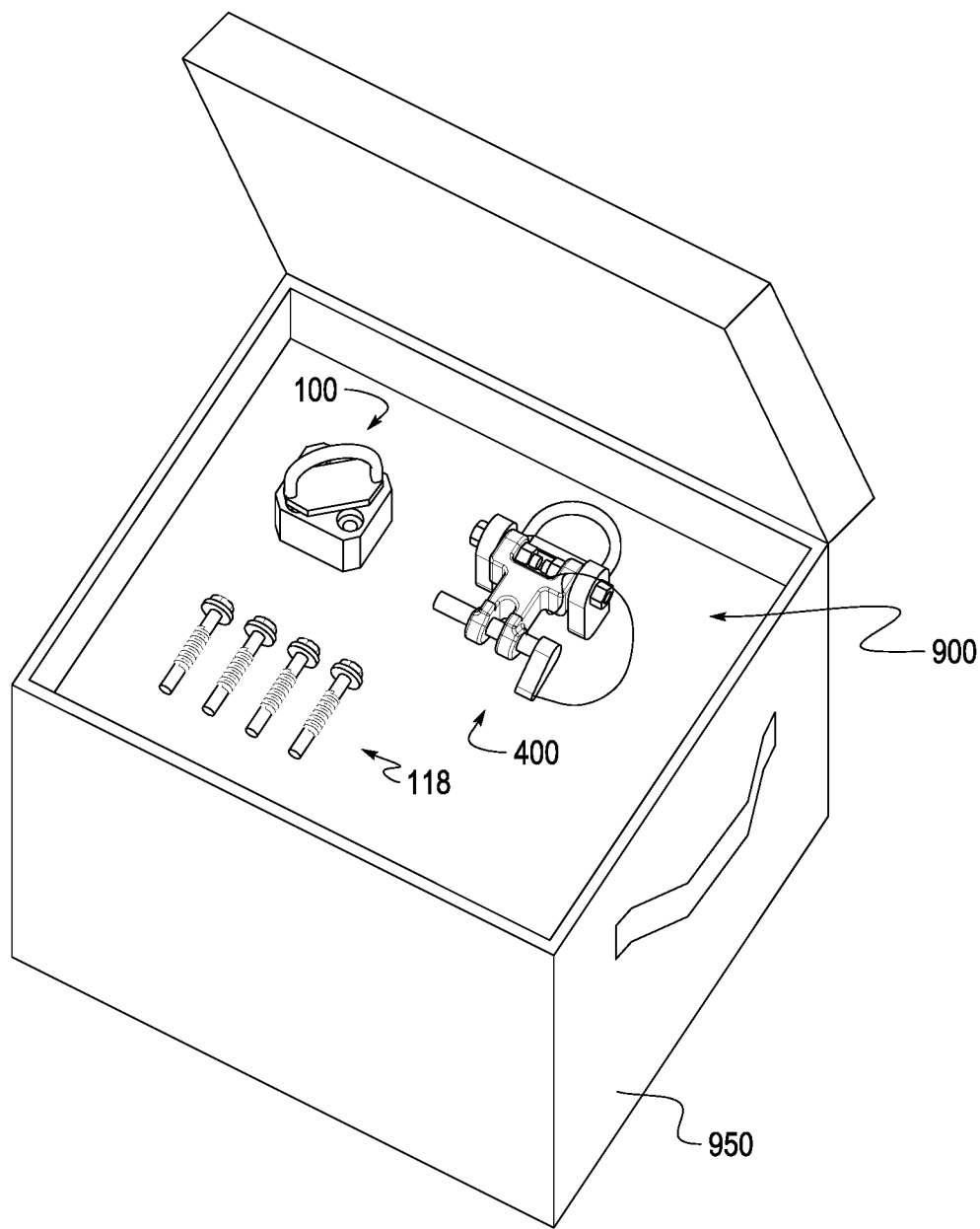
FIG. 9 is a diagram showing the components of the restraint system prepared for transport.

FIG. 9 shows a case 950 that houses a kit 900 that includes the first adapter 100 and the second adapter 400, as well as the bolts 118 used to connect the first adapter 100 to the corresponding attachment point. The case 950 may include an insert that provides the appropriate portability and protection for the kit 900. The kit 900 can also include lanyards 806 and a harness 808 (shown in FIG. 8), wherein the lanyards 806 are configured to connect the engagement components 112, 412 (e.g., rings) to the harness 808.

Different examples and aspects of the apparatus, system, and methods are disclosed herein that include a variety of components, features, and functionality. It should be understood that the various examples and aspects of the apparatus, system, and methods disclosed herein may include any of the components, features, and functionality of any of the other examples and aspects of the apparatus, system, and methods disclosed herein in any combination, and all of such possibilities are intended to be within the spirit and scope of the present disclosure.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled.

As used herein, the terms "system", "subsystem", "unit", or "module" may include any combination of hardware that operates to perform one or more functions. Thus, for example, one or more of the components may be implemented in a single piece of hardware or multiple pieces of hardware. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In the appended claims, the terms "including" and "in which" are used as the plain-English equivalents of the respective terms "comprising" and "wherein." Moreover, in the following claims, the terms "first", "second", and "third", etc. are used merely as labels, and are not intended to impose numerical requirements on their objects. Further, the limitations of the following claims are not written in means-plus-function format and are not intended to be interpreted based on 35 U.S.C. § 112, paragraph (f), unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A restraint system comprising:
    a first adapter comprising:
        a first body having a height defined by a distance from a first surface to a second surface opposite the first surface, the first body including a plurality of parallel cylindrical bores extending therethrough from the first surface to the second surface, wherein a cylindrical counterbore is defined in the second surface around each of the plurality of parallel cylindrical bores, the first surface defining a first plane, the second surface defining a second plane substantially parallel with the first plane;
        a first engagement component rotatably connected to the first body via the second surface, wherein the first engagement component is configured to rotate about a first axis that is substantially orthogonal to the second plane; and
        a first fastening component configured to fasten to a first attachment point of an aircraft via a threaded connection, wherein the first surface is configured to lie flush against the first attachment point while the first fastening component is fastened to the first attachment point; and
    a second adapter comprising:
        a second body comprising a first mounting plate and a second mounting plate coupled to the first mounting plate, wherein the first mounting plate comprises a first plurality of legs, wherein the second mounting plate comprises a second plurality of legs, and wherein the first mounting plate and the second mounting plate are coupled together via a first fastener extending through a first leg of the first plurality of legs and a second leg of the second plurality of legs;
        a second engagement component rotatably connected to the second body; and
        a second fastening component configured to mechanically fasten to a second attachment point of the aircraft, the second attachment point different from the first attachment point, wherein the first engagement component and the second engagement component are each configured to connect with a safety harness, via a respective lanyard.

2. The restraint system according to claim 1, wherein the second engagement component is rotatably coupled to the first mounting plate via a third surface, wherein the second mounting plate defines a fourth surface, the fourth surface having a first edge and a second edge, wherein the second fastening component is coupled to the second mounting plate proximate to the first edge, wherein the first mounting plate is coupled to the second mounting plate proximate to the second edge, and wherein the third surface and the fourth surface are substantially perpendicular.

3. The restraint system according to claim 2, wherein the third surface defines a third plane, wherein the second engagement component is configured to rotate about a second axis that is substantially orthogonal to the third plane.

4. The restraint system according to claim 2, wherein the third surface defines a first major plane of the first mounting plate, and wherein the fourth surface defines a second major plane of the second mounting plate.

5. The restraint system according to claim 1, wherein the first fastener includes a first bolt, and wherein the first mounting plate and the second mounting plate are further coupled together via a second bolt extending through a third leg of the first plurality of legs and a fourth leg of the second plurality of legs.

6. The restraint system according to claim 1, wherein the plurality of parallel cylindrical bores are configured to correspond to cylindrical bores in the first attachment point to allow for fastening the first adapter to the first attachment point.

7. The restraint system according to claim 6, wherein the first body includes a central cylindrical bore extending from the second surface through a portion of the height of the first body, wherein at least a portion of the first engagement component is disposed in the central cylindrical bore.

8. The restraint system according to claim 1, wherein the second fastening component includes a third plurality of legs defining a slot between the third plurality of legs, each leg of the third plurality of legs having a hole for receiving a fastener therethrough.

9. The restraint system according to claim 8, wherein the fastener is a pin, the pin arranged to extend through the third plurality of legs and through the second attachment point.

10. The restraint system according to claim 9, wherein the second attachment point is a lug disposed on an aft section of an aircraft wing.

11. The restraint system according to claim 10, wherein the second adapter is configured to cover a portion of the aft section of the aircraft wing, wherein a surface of the second adapter is configured to prevent alteration of a surface of the aircraft wing.

12. The restraint system according to claim 1, wherein the first body includes a surface and a recess defined in the surface, and the first engagement component is connected to the first body by a nut inserted into the recess in the surface of the first body.

13. The restraint system according to claim 1, wherein the first and second engagement components are first and second rings each having a stem, and the first and second adapters each include a bushing configured to receive therein the stem of the respective ring.

14. The restraint system according to claim 1, wherein the respective lanyards are configured to connect to the safety harness.

15. The restraint system according to claim 14, wherein the respective lanyards are sized to define a maximum movement direction along a wing of the aircraft.

16. A method for securing an operator to a component of an aircraft, the component including a forward attachment point, and an aft attachment point, the method comprising:
    connecting a forward adapter to the forward attachment point, the forward adapter comprising:
        a first body having a height defined by a distance from a first surface to a second surface opposite the first surface, the first body including a plurality of parallel cylindrical bores extending therethrough from the first surface to the second surface, wherein a cylindrical counterbore is defined in the second surface around each of the plurality of parallel cylindrical bores, the first surface defining a first plane, the second surface defining a second plane substantially parallel with the first plane;
a first engagement component rotatably connected to the first body via the second surface, wherein the first engagement component is configured to rotate about a first axis that is substantially orthogonal to the second plane; and
a first fastening component configured to connect the first body of the forward adapter to the forward attachment point via a threaded connection, wherein the first surface is configured to lie flush against the forward attachment point while the first fastening component is fastened to the forward attachment point;

connecting an aft adapter to the aft attachment point, the aft adapter comprising:
a second body comprising a first mounting plate and a second mounting plate coupled to the first mounting plate, wherein the first mounting plate comprises a first plurality of legs, wherein the second mounting plate comprises a second plurality of legs, and wherein the first mounting plate and the second mounting plate are coupled together via a first fastener extending through a first leg of the first plurality of legs and a second leg of the second plurality of legs;
a second engagement component rotatably connected to the second body, and
a second fastening component that mechanically connects the second body to the aft attachment point; and connecting a first lanyard to the first engagement component and a second lanyard to the second engagement component, each lanyard connected to a harness worn by the operator.

17. The method according to claim 16, wherein the connecting of the first lanyard to the forward adapter and the second lanyard to the aft adapter includes connecting the first lanyard to the harness and the second lanyard to the harness in a location whereby the operator is positioned between the forward adapter and the aft adapter and movement in at least one direction is limited.

18. The method according to claim 16, wherein the forward attachment point is at a forward section of an aircraft wing and the aft attachment point is at an aft section of the aircraft wing.

19. A kit comprising:
a forward adapter configured to connect with a forward attachment point of a wing of an aircraft, the forward adapter comprising a first body, a first engagement component rotatably connected to the first body, and a first fastening component configured to connect the first body of the forward adapter to the forward attachment point of the wing of the aircraft via a threaded connection, the first body having a height defined by a distance from a first surface to a second surface opposite the first surface, the first surface defining a first plane, the second surface defining a second plane substantially parallel with the first plane, the first body including a plurality of parallel cylindrical bores extending therethrough from the first surface to the second surface, wherein a cylindrical counterbore is defined in the second surface around each of the plurality of parallel cylindrical bores, wherein the first engagement component is rotatably coupled to the first body via the second surface, wherein the first engagement component is configured to rotate about a first axis that is substantially orthogonal to the second plane, and wherein the first surface is configured to lie flush against the forward attachment point while the first fastening component is fastened to the forward attachment point; and an aft adapter configured to connect with an aft attachment point of the wing of the aircraft, the aft adapter comprising a second body, a second engagement component rotatably connected to the second body, and a second fastening component configured to mechanically connect the second body to the aft attachment point of the wing of the aircraft, the second body comprising a first mounting plate and a second mounting plate coupled to the first mounting plate, wherein the first mounting plate comprises a first plurality of legs, wherein the second mounting plate comprises a second plurality of legs, and wherein the first mounting plate and the second mounting plate are coupled together via a first fastener extending through a first leg of the first plurality of legs and a second leg of the second plurality of legs, wherein the forward adapter and the aft adapter are configured to allow multi-axis movement along the wing of the aircraft while limiting a travel distance forward and aft on the wing of the aircraft, and wherein the forward adapter and the aft adapter are each configured to connect to a respective lanyard of a plurality of lanyards, the lanyards of the plurality of lanyards configured to connect the first engagement component and the second engagement component to a harness.

20. The kit according to claim 19, further comprising the plurality of lanyards and the harness, wherein to allow multi-directional movement along the wing of the aircraft, the first engagement component is rotatably connected to the first body and the second engagement component is rotatably connected to the second body.

* * * * *